US008438028B2

(12) United States Patent
Chengalvarayan et al.

(10) Patent No.: US 8,438,028 B2
(45) Date of Patent: May 7, 2013

(54) NAMETAG CONFUSABILITY DETERMINATION

(75) Inventors: Rathinavelu Chengalvarayan, Naperville, IL (US); Lawrence D. Cepuran, Northville, MI (US)

(73) Assignee: General Motors LLC, Detroit, MI (US)

( * ) Notice: Subject to any disclaimer, the term of this patent is extended or adjusted under 35 U.S.C. 154(b) by 243 days.

(21) Appl. No.: 12/782,141

(22) Filed: May 18, 2010

(65) Prior Publication Data

US 2011/0288867 A1    Nov. 24, 2011

(51) Int. Cl.
  *G10L 15/06*  (2006.01)
  *G10L 15/00*  (2006.01)
  *G10L 15/04*  (2006.01)
  *G10L 21/00*  (2006.01)

(52) U.S. Cl.
  USPC ............ 704/243; 704/239; 704/254; 704/270

(58) Field of Classification Search .................. 704/239, 704/243, 244, 254, 257, 270
  See application file for complete search history.

(56) References Cited

U.S. PATENT DOCUMENTS

| | | | | | |
|---|---|---|---|---|---|
| 5,220,639 | A | * | 6/1993 | Lee ................................ | 704/200 |
| 5,606,644 | A | * | 2/1997 | Chou et al. ..................... | 704/243 |
| 5,684,924 | A | * | 11/1997 | Stanley et al. .................. | 704/233 |
| 6,188,976 | B1 | * | 2/2001 | Ramaswamy et al. ............ | 704/9 |
| 6,263,216 | B1 | * | 7/2001 | Seydoux et al. ............... | 455/564 |
| 6,563,911 | B2 | * | 5/2003 | Mahoney .................... | 379/88.03 |
| 6,925,154 | B2 | * | 8/2005 | Gao et al. ..................... | 379/88.03 |
| 7,013,276 | B2 | * | 3/2006 | Bickley et al. ................. | 704/255 |
| 7,269,563 | B2 | * | 9/2007 | Douros ........................ | 704/275 |
| 7,275,033 | B1 | * | 9/2007 | Zhao et al. .................... | 704/255 |
| 7,711,551 | B2 | * | 5/2010 | Lopez-Barquilla et al. ...... | 704/9 |
| 7,844,456 | B2 | * | 11/2010 | Cai et al. ....................... | 704/243 |
| 8,229,743 | B2 | * | 7/2012 | Carter et al. .................. | 704/251 |
| 2006/0215821 | A1 | * | 9/2006 | Rokusek et al. ........... | 379/88.01 |
| 2007/0250320 | A1 | * | 10/2007 | Chengalvarayan ........... | 704/254 |
| 2008/0126100 | A1 | * | 5/2008 | Grost et al. ................... | 704/275 |
| 2008/0133245 | A1 | * | 6/2008 | Proulx et al. ................... | 704/277 |

OTHER PUBLICATIONS

Roe et al."Prediction of word confusabilities for speech recognition". In Proceedings of the ICSLP Sep. 1994, pp. 227-230.*

Bellegarda, "Large Vocabulary Speech Recognition with Multispan Statistical Language Models," IEEE transactions on Speech and Audio Processing, vol. 8, No. 1, Jan. 2000, pp. 76-84.*

* cited by examiner

*Primary Examiner* — James Wozniak

(74) *Attorney, Agent, or Firm* — Anthony L. Simon; Reising Ethington P.C.

(57) ABSTRACT

A method of and system for managing nametags including receiving a command from a user to store a nametag, prompting the user to input a number to be stored in association with the nametag, receiving an input for the number from the user, prompting the user to input the nametag to be stored in association with the number, receiving an input for the nametag from the user, processing the nametag input, and calculating confusability of the nametag input in multiple individual domains including a nametag domain, a number domain, and a command domain.

11 Claims, 3 Drawing Sheets

ND TAG CONFUSABILITY
DETERMINATION

TECHNICAL FIELD

The present invention relates generally to managing nametags for voice dialing applications.

BACKGROUND OF THE INVENTION

Automatic speech recognition (ASR) technologies enable microphone-equipped computing devices to interpret speech and thereby provide an alternative to conventional human-to-computer input devices such as keyboards or keypads. One application of ASR includes telecommunication devices equipped with voice dialing functionality to initiate telecommunication sessions. An ASR system detects the presence of discrete speech, like spoken commands, nametags, and numbers, and is programmed with predefined acceptable vocabulary that the system expects to hear from a user at any given time, known as in-vocabulary speech. For example, during voice dialing, the ASR system may expect to hear command vocabulary (e.g. Call, Dial, Cancel, Help, Repeat, Go Back, and Goodbye), nametag vocabulary (e.g. Home, School, and Office), and digit or number vocabulary (e.g. Zero-Nine, Pound, Star).

One general problem encountered with voice dialing is that ASR-enabled devices sometimes misrecognize a user's intended input speech, according to rejection, insertion, and/or substitution errors. A rejection error occurs when the ASR system fails to interpret a user's intended input utterance. An insertion error occurs when the ASR system interprets unintentional input, such as background noise or a user cough, as an intended user input utterance. A substitution error occurs when the ASR system mistakenly interprets a user's intended input utterance for a different input utterance.

A substitution error is usually due to confusability between similar sounding words. In a general example, when a user tries to store a nametag that sounds exactly like an already-stored nametag, number, or command, then the ASR system will have difficulty processing the nametag because it is not sufficiently unique. In more specific example, a substitution error sometimes occurs where a nametag is misinterpreted as one or more digits to be dialed, for instance, where a user has defined a nametag to include a number. As a result, the ASR system may process the incorrect word, or may repetitively ask the user to repeat the nametag. In either case, the user can become frustrated.

Existing solutions to this problem are not optimal. One solution is to prompt the user to not store nametags having numbers in them. This solution is flawed because some nametags sound like numbers even though the nametags do not include numbers. Another solution is to separate voice dialing dialogs into a "Call"<nametag> dialog and a "Dial"<digits> dialog. This solution is imperfect because it reduces user flexibility of entering numbers or nametags in a conjoined command dialog (e.g. Call/Dial).

Another solution is nametag confusability detection, which is carried out using both stored nametags and supported ASR commands simultaneously. For example, a user utters a command word like "Store" at a main menu of an ASR system, the system prompts for a telephone number to be stored in association with a nametag, and the user responds by uttering the digits comprising the number to be stored. Then, the system prompts for a nametag, and the user responds by uttering the particular nametag. Thereafter, the system calculates a confusability score for the uttered nametag by comparing the uttered nametag with all previously stored nametags and commands combined, at the same time, and sequentially nametag-by-nametag and command-by-command. If the confusability calculation is too high, the system prompts the user to use a different nametag. But this solution does not account for nametag confusability with digits, which, for a sixteen-digit string, could include trillions of different numbers and, thus, trillions of resource intensive computations as the nametag is compared sequentially number-by-number through all 0-16 digit numbers. Such confusability checks are resource prohibitive and, thus, those of ordinary skill in the art are discouraged from carrying out nametag confusability checks with numbers.

SUMMARY OF THE INVENTION

According to one aspect of the invention, there is provided a method of speech recognition. The method includes the steps of managing nametags including receiving a command from a user to store a nametag, prompting the user to input a number to be stored in association with the nametag, receiving an input for the number from the user, prompting the user to input the nametag to be stored in association with the number, receiving an input for the nametag from the user, processing the nametag input, and calculating confusability of the nametag input in multiple individual domains including a nametag domain, a number domain, and a command domain.

According to another aspect of the invention, a computer program product includes instructions on a computer readable medium and executable by a computer processor of a speech recognition system to cause the system to implement the aforementioned method steps.

According to an additional aspect of the invention, there is provided a speech recognition system including an acoustic interface to receive a command from a user to store a nametag, prompt the user to input a number to be stored in association with the nametag, receive an input for the number from the user, prompt the user to input the nametag to be stored in association with the number, and receive an input for the nametag from the user. The system also includes a processor to process the nametag input to provide a recognition result, and a post-processor to receive the recognition result from the processor and use the recognition result as input to calculate confusability of the nametag input in multiple individual domains including a nametag domain, a number domain, and a command domain.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The following description describes an example communications system, an example ASR system that can be used with the communications system, and one or more example methods that can be used with one or both of the aforementioned systems. The methods described below can be used by a vehicle telematics unit (VTU) as a part of recognizing speech uttered by a user of the VTU. Although the methods described below are such as they might be implemented for a VTU, it will be appreciated that they could be useful in any type of vehicle speech recognition system and other types of speech recognition systems. For example, the methods can be implemented in ASR-enabled mobile computing devices or systems, personal computers, or the like.

Communications System—

Figure 1:
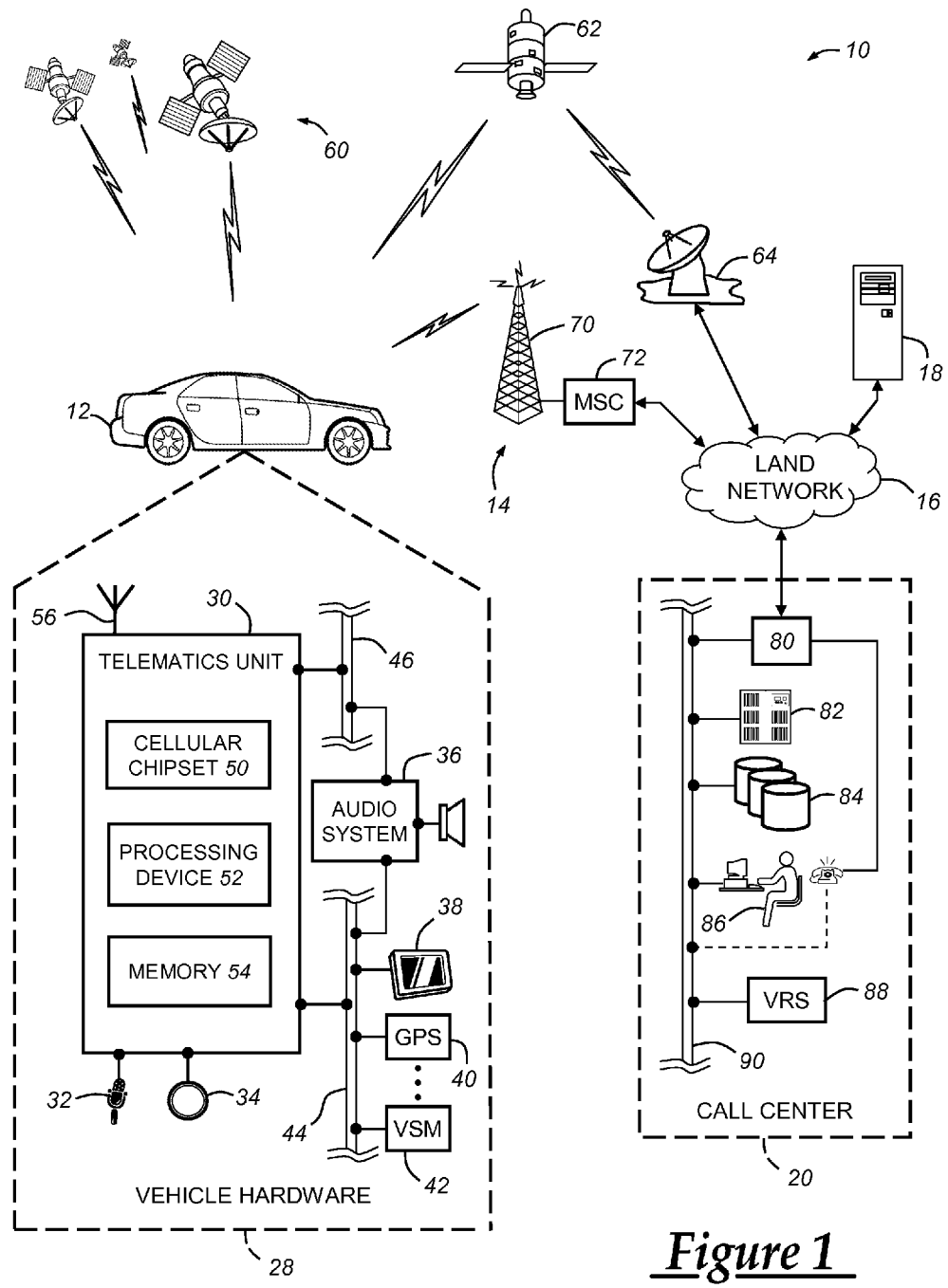
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automatic voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automatic voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automatic voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automatic advisor or, a combination of VRS 88 and the live advisor 86 can be used.

Automatic Speech Recognition System—

Figure 2:
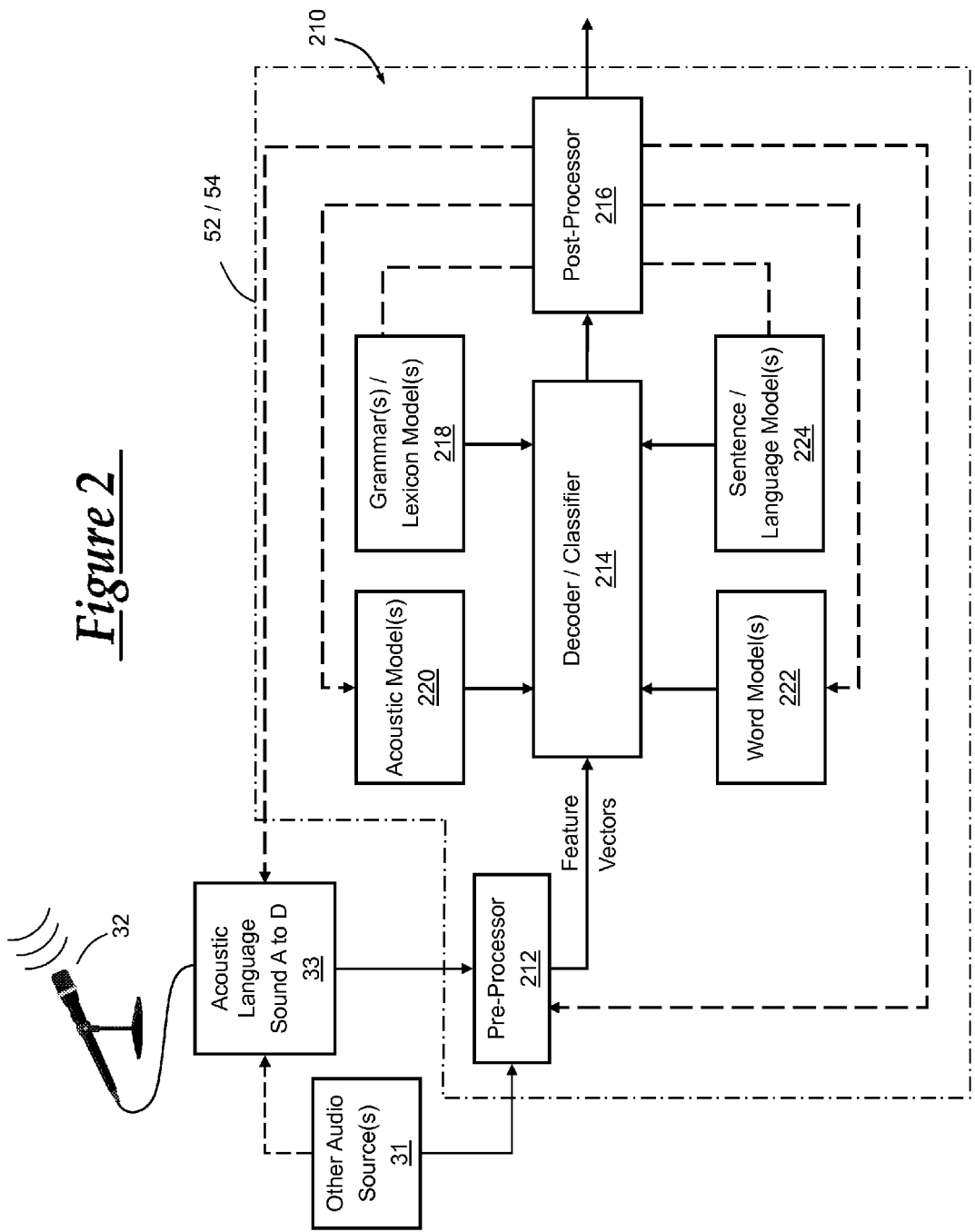
FIG. 2 is a block diagram illustrating an exemplary embodiment of an automatic speech recognition (ASR) system that can be used with the system of FIG. 1 and used to implement exemplary methods of speech recognition.

Turning now to FIG. 2, there is shown an exemplary architecture for an ASR system 210 that can be used to enable the presently disclosed method. In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific exemplary ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 12 such as the call center 20. For example, grammar models, acoustic models, and the like can be stored in memory of one of the servers 82 and/or databases 84 in the call center 20 and communicated to the vehicle telematics unit 30 for in-vehicle speech processing. Similarly, speech recognition software can be processed using processors of one of the servers 82 in the call center 20. In other words, the ASR system 210 can be resident in the telematics unit 30 or distributed across the call center 20 and the vehicle 12 in any desired manner.

First, acoustic data is extracted from human speech wherein a vehicle occupant speaks into the microphone 32, which converts the utterances into electrical signals and communicates such signals to the acoustic interface 33. A sound-responsive element in the microphone 32 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 transforms the continuous stream of digital speech data into discrete sequences of acoustic parameters. More specifically, the processor 52 executes the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 receives the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

Method—

Figure 3:
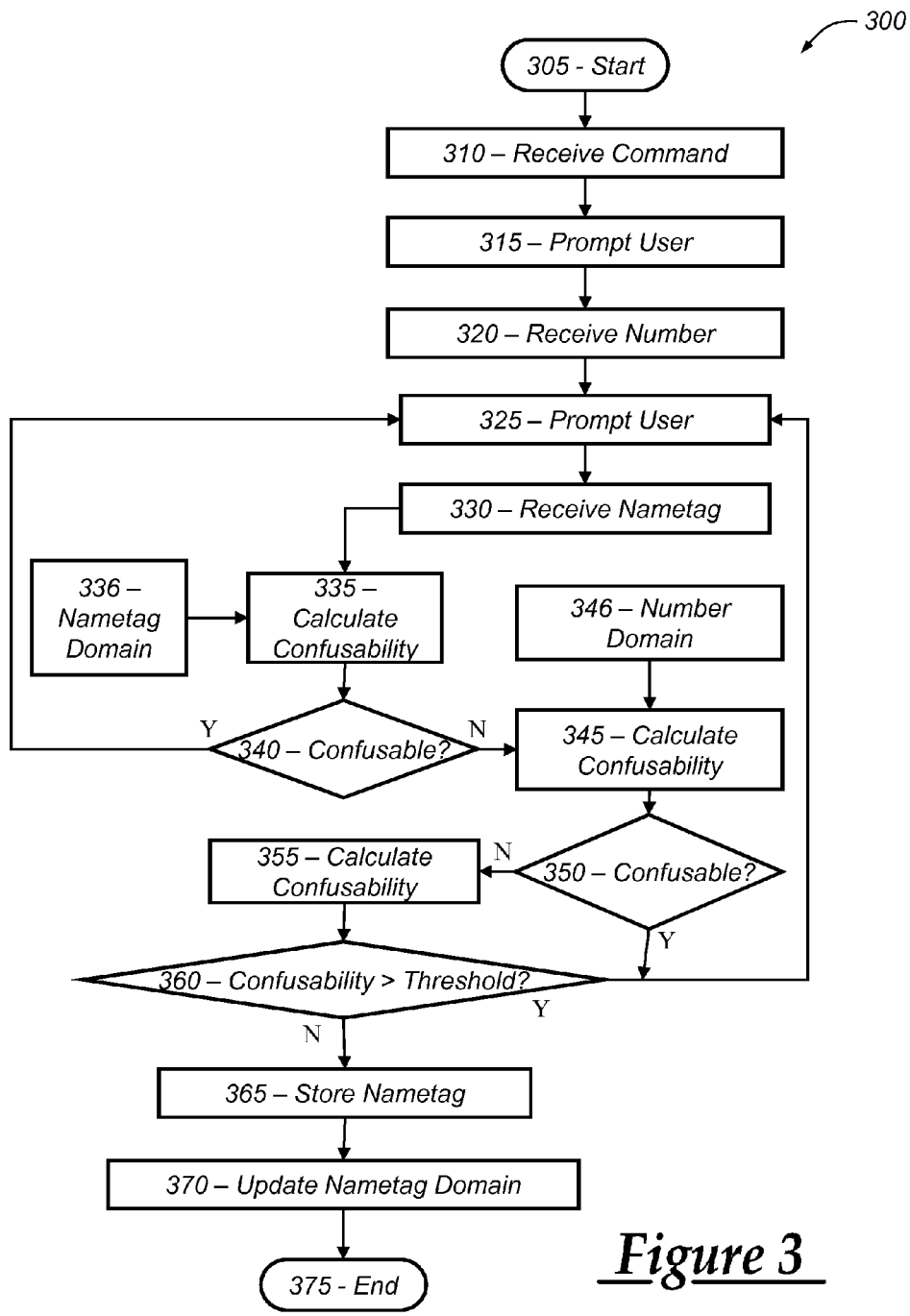
FIG. 3 is a flow chart illustrating an exemplary embodiment of a method of speech recognition that can be carried out by the ASR system of FIG. 2.

Turning now to FIG. 3, there is shown a nametag management method 300 that can be carried out using suitable programming of the ASR system 210 of FIG. 2 within the operating environment of the vehicle telematics unit 30 as well as using suitable hardware and programming of the other components shown in FIG. 1. These features of any particular implementation will be known to those skilled in the art based on the above system description and the discussion of the method described below in conjunction with the remaining figures. Those skilled in the art will also recognize that the method can be carried out using other ASR systems within other operating environments.

In general, the method 300 improves nametag confusability detection by receiving a command from a user to store a nametag, prompting the user to input a number to be stored in association with the nametag, receiving an input for the number from the user, prompting the user to input the nametag to be stored in association with the number, receiving an input for the nametag from the user, processing the nametag input, and calculating confusability of the nametag input in multiple individual domains including a nametag domain, a number domain, and a command domain. The method 300 is carried out during a nametag storage session wherein state memory is retained, and is not carried out during speech recognition runtime.

Referring again to FIG. 3, the method 300 begins in any suitable manner at step 305. For example, a vehicle user starts interaction with the user interface of the telematics unit 30, preferably by depressing the user interface pushbutton 34 to begin a session in which the user inputs voice commands that are interpreted by the telematics unit 30 while operating in speech recognition mode. Using the audio system 36, the telematics unit 30 can acknowledge the pushbutton activation by playing a sound or providing a verbal request for a command from the user or occupant. In another example, the method can be carried out on a mobile computing device of any kind, wherein a device user can start interaction with the device by pushbutton or touch screen depression, voice command, or the like. The mobile computing device can be enabled with text-to-speech functionality and/or ASR functionality as is known to those of ordinary skill in the art. In a further example, the method can be carried out via the computer 18 of the communications system 10 of FIG. 1, for example, via Internet-accessible telematics account software that allows a user to manage the user's telematics account and data including nametags. Such telematics account software is well known to those of ordinary skill in the art and can be served by hardware in the call center 20 or in any other location. In this example, a user can start interaction with the computer 18 by pointer selection, touch screen depression, voice command, or the like.

At step 310, a command to store a nametag is received from a user. For example, the telematics unit 30 can receive a voice instruction such as "Store Nametag" from a vehicle occupant via the user interface microphone 32. In another example, the telematics unit 30 can receive a keypad or touch screen input or instruction via the telematics user interface. In a further example, the mobile computing device can receive keypad or touch screen input or instruction via any suitable user interface of the device. In yet another example, the command may be received via the computer 18 in any suitable manner by any suitable user interface like a keyboard, pointing device, or the like.

At step 315, the user is prompted to enter a number to be stored in association with the nametag. For example, the telematics unit 30 can acknowledge the user voice instruction from step 310 and prompt the user to utter the number via the loudspeaker of the audio system 36. In other examples, the telematics unit 30, the mobile computing device, and/or the computer 18 can prompt the user to manually enter the number via a display, loudspeaker, or any other user interface.

At step 320, a number input for the number is received from the user. For example, the telematics unit 30 can receive the number input via the microphone 32. In other examples, the telematics unit 30, the mobile computing device, and/or the computer 18 can receive the input via a numerical or alpha-numerical keypad or keyboard, touch screen, microphone, or any other suitable user interface.

At step 325, the user is prompted to enter the nametag to be stored in association with the number. For example, the telematics unit 30 can acknowledge the number input from step 320 and prompt the user to utter the nametag via the loudspeaker of the audio system 36. In other examples, the telematics unit 30, the mobile computing device, and/or the computer 18 can prompt the user to manually enter the nametag via a display, loudspeaker, or any other user interface device.

At step 330, a nametag input for the nametag is received from the user and processed. For example, the telematics unit 30 can receive the nametag input via the microphone 32. In other examples, the telematics unit 30, the mobile computing device, and/or the computer 18 can receive the input via an alphabetical or alpha-numerical keyboard, touch screen, microphone, or any other suitable user interface.

In a speaker-independent embodiment, the nametag input is a text entry from the user, and text-to-speech (TTS) software converts the text entry to a sequence of phonemes. The TTS software can be embedded in the telematics unit 30, in the mobile computing device, in hardware serving the telematics account software accessible by the computer 18, or the like. TTS software and functionality are well known to those of ordinary skill in the art.

In a speaker-dependent embodiment, the nametag input is an utterance from the user, and the utterance is decoded using one or more statistical language models (SLMs) and one or more semantic classifiers trained on the nametag domain, the number domain, and the command domain. In one example, the SLM(s) can be represented by the models 222, 224 of the ASR system 210 of FIG. 2, and the semantic classifier(s) can be represented by the classifier(s) 214 of the ASR system 210 of FIG. 2.

An SLM provides a probability of a word given one or more other words. For example, a bi-gram SLM provides a probability of a word given one other word, a tri-gram SLM provides a probability of a word given two other words, and an n-gram SLM provides a probability of a word given n+1 other words. The semantic classifier provides a probability that a word belongs to one of several different semantic classes or domains. The semantic classifier can produce an N-best list of hypotheses and associated confidence scores. One SLM and one semantic classifier trained on all three domains can be used, or multiple SLMs and/or multiple semantic classifiers can be trained individually on any of the domains, or the like.

Instead of calculating confusability of a nametag with all possible 10-digit numbers, a semantic class or domain can be created for numbers and used to train an SLM and a semantic classifier during speech recognition system development before use in the field. The number domain for the SLM is smaller than the billions of different combinations (10!) of a ten digit number. For example, the number domain may be all valid telephone numbers in a given country or for a given service provider, or the like. All such 10-digit valid telephone numbers can be provided in text format and fed to an SLM builder to create the SLM with a probability for each digit followed by each digit and the like. The raw input text for training the SLM will contain thousands of digit-sequences for numbers, commands, and nametags, and each text is tagged in any suitable manner with its corresponding semantic class. The SLM and the semantic classifier can be trained at the same time and, once trained, then nametag storage in the field is carried out using the trained SLM and semantic classifier.

Steps 335-360 represent an example embodiment of nametag confusability determination, wherein confusability of the nametag input is determined in multiple individual domains including a nametag domain, a number domain, and a command domain. As shown in FIG. 3, the method 300 can proceed in a sequential, domain-by-domain manner through the independent and separate domains. Although shown in a particular sequence of domains (nametag/number/command), the method can be carried out in any other sequence. For example, other sequences can include the following domain ordering: nametag/command/number, number/nametag/command, number/command/nametag, command/nametag/number, or command/number/nametag.

At step 335, confusability of the nametag input is calculated with previously stored nametags, using a nametag domain 336. The nametag domain 336 may be created or trained in advance of runtime to have universal nametags like Emergency, Information, or the like. In any event, the nametag domain 336 can be added to with personal nametags like Home, Office, or School, for example.

In general, confusability calculations are well known to those skilled in the art and reflect the fact that a certain component of speech can be confused with a similar component such as the confusion of the sounds "q" and "u" or "m" and "n". Confusability calculations also receive as input circumstantial conditions such as environmental noise and speaker based variables like speaker gender or dialect that affect an incoming voice signal and affect differentiation of various speech components. One approach for determining confusability involves using a confusability calculation including confusion tables and matrices, as is disclosed in U.S. patent application publication 2007/0174055, which is incorporated by reference herein in its entirety. Other approaches for determining confusability can be used in addition to or in lieu of confusability calculations.

For the speaker-independent embodiment, the confusability calculation can be based on a comparison of the text entry sequence of phonemes to phonemes of entries already stored in at least one of the domains. In one example, a text-to-speech (TTS) system processor can convert the text entry into the sequence of phonemes, and a TTS post-processor can receive the phoneme sequence from the TTS processor and carry out the confusability calculations. The phoneme-based confusability score is minimum if the sequence of phonemes converted from the text entry does not correspond to phonemes of any stored entry in any of the domains. In contrast, the phoneme-based confusability score is maximum if the sequence of phonemes converted from the text entry corresponds identically to a sequence of phonemes of any stored entry in any of the domains.

To illustrate, there are about 41 phonemes that are unique speech units that constitute the U.S.-English language. The following are examples of speaker independent confusability calculations. The name Jim includes three phonemes (JH/IH/M), and the name Tim also includes three phonemes (T/IH/M). In this example, the confusability score is intermediate the minimum and maximum and could be 66, which means a 66% overlap or correspondence of phonemes. In contrast, the name John include three phonemes (JH/AA/N), and the name Steve includes four phonemes (S/T/IY/V). In this example, the confusability score is 0 which means there is no correspondence or overlap of phonemes.

For the speaker-dependent embodiment, the confusability calculation can be based on at least one confidence score output from the semantic classifier. For example, a speech recognition decoder can use one or more suitable acoustic models and the SLM to provide a recognition result for the input nametag. In turn, the recognition result is passed along to the semantic classifier to provide an indication of whether the result belongs to the digits domain, the nametag domain, or the command domain. The semantic classifier can provide an N-best list of results that can include each domain and a confidence score for each domain wherein the higher the confidence score, the more likely it is that the nametag input is within the domain associated with the confidence score. In a specific example, the nametag input can be "Kaushik's Cell Phone" and, unfortunately, the recognition result can be "741." The semantic classifier can classify the result with confidence scores, as follows: 65% confidence that input is in the number domain; 50% confidence that input is in the nametag domain; and 30% confidence that input is in the command domain.

At step 340, a determination is made as to whether input nametag is confusable with the nametag domain. If so, the method loops back to step 325 wherein the user is prompted to utter a different nametag to be stored in association with the number, otherwise the method proceeds to step 345.

In the speaker-independent embodiment, a determination is made as to whether the calculated confusability of step 335 exceeds a nametag domain confusability threshold. For example, if the phoneme-based confusability score is greater than 60% then the nametag input can be determined to be confusable.

In the speaker-dependent embodiment, the ASR post-processor 216 can receive one or more of the individual domains and associated confidence score(s) from the semantic classifier and compare the confidence score(s) to one or more confusability thresholds. In other words, the confusability calculation can be based on at least one of the confidence scores output from the semantic classifier. The threshold(s) can be, for example, from 40%-60%, but those of ordinary skill in the art will recognize that the threshold(s) can be application specific and can be determined by empirical testing, modeling, or both. Thus, the threshold(s) can be any suitable value(s). In the nametag domain in particular, the nametag input can be determined to be confusable with the nametag domain if the nametag domain confidence score from the semantic classifier is below or subcedes a nametag confusability threshold value, for example, 50%.

At step 345, confusability of the nametag input is calculated with numbers or continuous digits, using a number domain 346 of the SLM. In one example, the number domain for the SLM can be all valid telephone numbers in a given country or for a given service provider, or the like. The discussion of confusability calculations from step 335 is incorporated by reference here.

At step 350, a determination is made whether the calculated confusability of step 345 exceeds a number domain confusability threshold. If so, the method loops back to step 325 wherein the user is prompted to utter a different nametag to be stored in association with the number, otherwise the method proceeds to step 355.

At step 355, confusability of the nametag input is calculated with a command domain. For example, the command domain may include those commands that are supported by the system, like Call, Dial, Cancel, and/or the like. The discussion of confusability calculations from step 335 is incorporated by reference here.

At step 360, a determination is made whether the calculated confusability of step 355 exceeds a command domain confusability threshold. If so, the method loops back to step 325 wherein the user is prompted to utter a different nametag to be stored in association with the number, otherwise, the method proceeds to step 365.

In one example embodiment, the confusability thresholds for two or more of the domains are all equal to one another to reduce computational complexity. For example, such a common threshold can be 50%. In another embodiment, the confusability thresholds are all different from one another. For example, the number domain threshold can be 60%, the nametag domain threshold can be 50%, and the command domain threshold can be 40%.

At step 365, if the nametag input was not determined to be confusable, then the nametag input is stored in association with the nametag. For example, the nametag input can be stored in any suitable memory, for example, in the telematics unit 30, in hardware of the call center 20, or in any suitable memory location(s).

At step 370, if the nametag input was not determined to be confusable, then the nametag domain is updated with the stored nametag input and/or the associated nametag, and the SLM and/or semantic classifier are retrained using the updated nametag domain. Updating of domains and retraining of SLMs and semantic classifiers are, in and of themselves, techniques well known to those of ordinary skill in the art.

At step 375, the method may end in any suitable manner.

Although this method may not reveal with certainty an exact digit string, command, or other nametag with which the nametag is being confused, the confusability calculation is reliable and carried out much faster than ever before possible. The system can inform the user that the nametag input was confusable with some number, and can request the user to please choose another nametag or to say the nametag with additional context, or the like.

The method or parts thereof can be implemented in a computer program product including instructions carried on a computer readable medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of executing instructions corresponding to one or more steps of the disclosed method.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the invention can be applied to other fields of speech signal processing, for instance, mobile telecommunications, voice over internet protocol applications, and the like. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing nametags, comprising the steps of:
   (a) receiving a command from a user to store a nametag;
   (b) prompting the user to input a number to be stored in association with the nametag;
   (c) receiving an input for the number from the user;
   (d) prompting the user to input the nametag to be stored in association with the number;
   (e) receiving an input for the nametag from the user;
   (f) processing the nametag input from step (e), by decoding the nametag input using at least one statistical language model trained on multiple semantic domains including a semantic nametag domain and a semantic number domain to provide a recognition result for the nametag input;
   (g) determining confusability of the nametag input by using at least one semantic classifier trained on the multiple semantic domains to classify the recognition result with a confidence score for each of the domains as an indication of the likelihood that the nametag input is within a particular one of the domains, and by comparing the confidence scores for the multiple semantic domains to at least one confusability threshold; and (h) prompting the user to input a different nametag to be stored in association with the number, if the confidence score associated with the semantic number domain exceeds the confusability threshold.

2. The method of claim 1, further comprising the step of (i) retraining the SLM and semantic classifier using the nametag input if the nametag input was not determined to be confusable.

3. The method of claim 1, wherein the at least one confusability threshold is the same for the semantic nametag and number domains.

4. The method of claim 1, wherein the at least one confusability threshold includes a nametag confusability threshold and a number confusability threshold, wherein the confusability thresholds are all different from one another.

5. A computer program product including instructions on a non-transitory computer readable medium and executable by a computer processor of a system to cause the system to implement steps recited in claim 1.

6. A method of managing nametags, comprising the steps of:
  (a) receiving a command from a user to store a nametag;
  (b) prompting the user to input a number to be stored in association with the nametag;
  (c) receiving an input for the number from the user;
  (d) prompting the user to input the nametag to be stored in association with the number;
  (e) receiving an input for the nametag from the user, in the form of a text entry;
  (f) processing the nametag input from step (e) including converting the text entry to a sequence of phonemes, and using at least one statistical language model trained on multiple independent domains to provide a recognition result for the nametag input, wherein the domains include a nametag domain and a multiple-digit telephone number domain that is smaller than the different combinations of a ten digit number;
  (g) calculating confusability based on a comparison of the text entry sequence of phonemes to phonemes of entries in the multiple independent domains by using at least one semantic classifier trained on the multiple independent domains to classify the recognition result with a confidence score for each of the domains as an indication of the likelihood that the nametag input is within a particular one of the domains, and by comparing the confidence score for each of the domains to at least one confusability threshold; and
  (h) prompting the user to input a different nametag to be stored in association with the number, if the confidence score exceeds the at least one confusability threshold.

7. The method of claim 6, wherein the phoneme-based confusability score is minimum if the sequence of phonemes converted from the text entry does not correspond to phonemes of any stored entry in any of the domains, and the phoneme-based confusability score is maximum if the sequence of phonemes converted from the text entry corresponds identically to a sequence of phonemes of any stored entry in any of the domains.

8. A system to manage nametags, comprising:
  an interface, including a microphone, to receive a command from a user to store a nametag, prompt the user to enter a number to be stored in association with the nametag, receive a number input for the number from the user, prompt the user to enter the nametag to be stored in association with the number, and receive a nametag input for the nametag from the user via the microphone; and
  a processor in communication with the interface and including:
    a decoder to process the nametag input to provide a recognition result by decoding the nametag input using at least one statistical language model trained on multiple semantic domains including a semantic nametag domain and a semantic number domain;
    at least one semantic classifier trained on the multiple semantic domains to classify the recognition result with a confidence score for each of the domains as an indication of the likelihood that the nametag input is within a particular one of the domains; and
    a post-processor to receive the recognition result from the decoder and use the recognition result as input to determine confusability of the nametag input in the multiple domains by comparing the confidence score to at least one confusability threshold, and to prompt the user to input a different nametag to be stored in association with the number, if the confidence score exceeds the confusability threshold.

9. The system of claim 8, wherein the nametag input is an utterance from the user and the decoder decodes the utterance using a statistical language model (SLM) and a semantic classifier trained on the nametag domain, the number domain, and the command domain, and the post-processor retrains the SLM and semantic classifier using the nametag input if the nametag input is not determined to be confusable.

10. The system of claim 9, wherein the decoder produces an N-best list of hypotheses and associated confidence scores, and the post-processor calculates the confusability based on at least one of the confidence scores.

11. The system of claim 8, wherein the nametag input is a text entry from the user and the decoder converts the text entry to a sequence of phonemes, and the post-processor calculates the confusability based on a comparison of the text entry sequence of phonemes to phonemes of entries in at least one of the domains.

* * * * *